Sept. 5, 1950 — H. L. MINAKER — 2,521,241
FISH CUTTING AND CLEANING MACHINE
Filed July 29, 1944 — 3 Sheets-Sheet 1
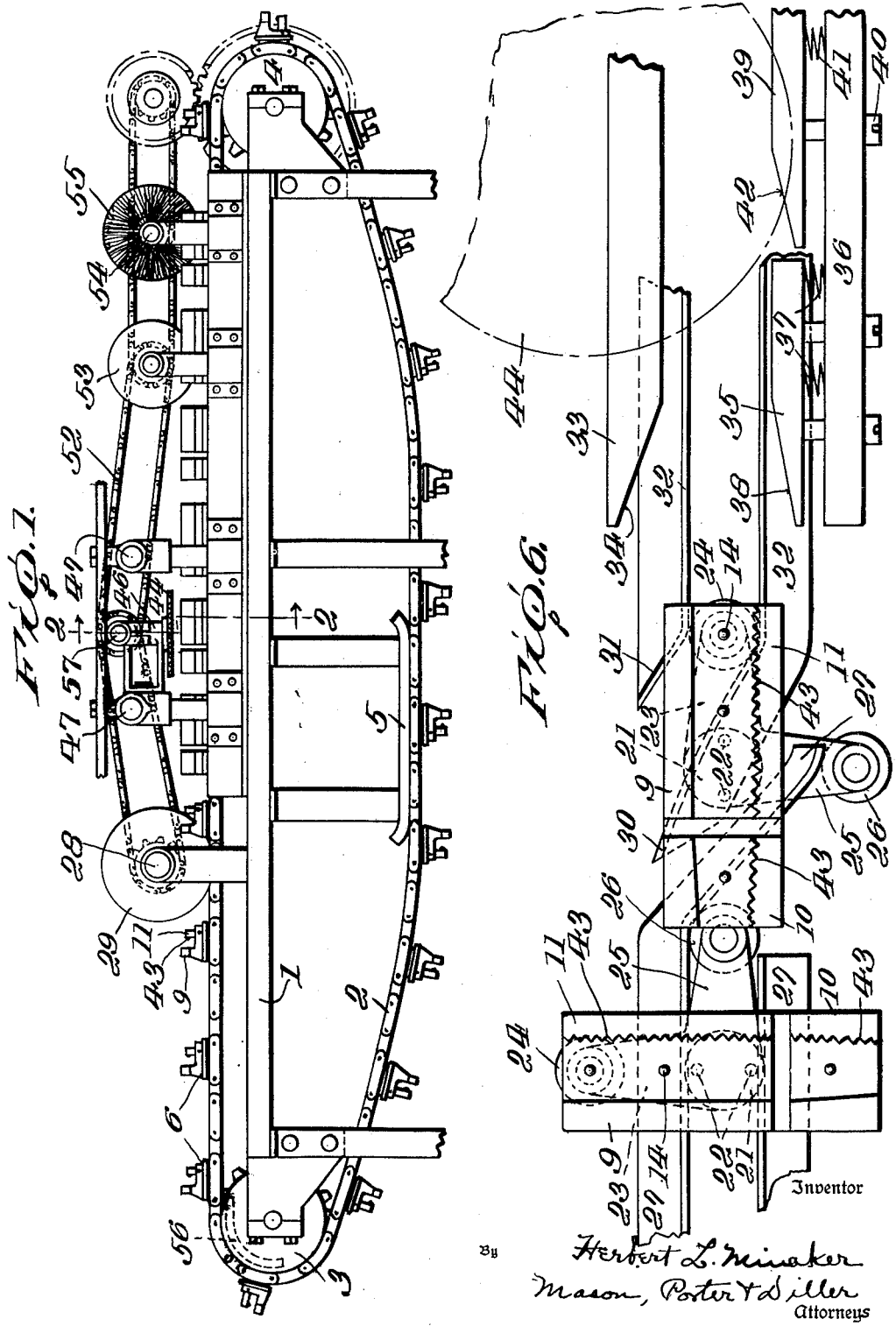
Inventor
Herbert L. Minaker
Mason, Porter & Diller
Attorneys

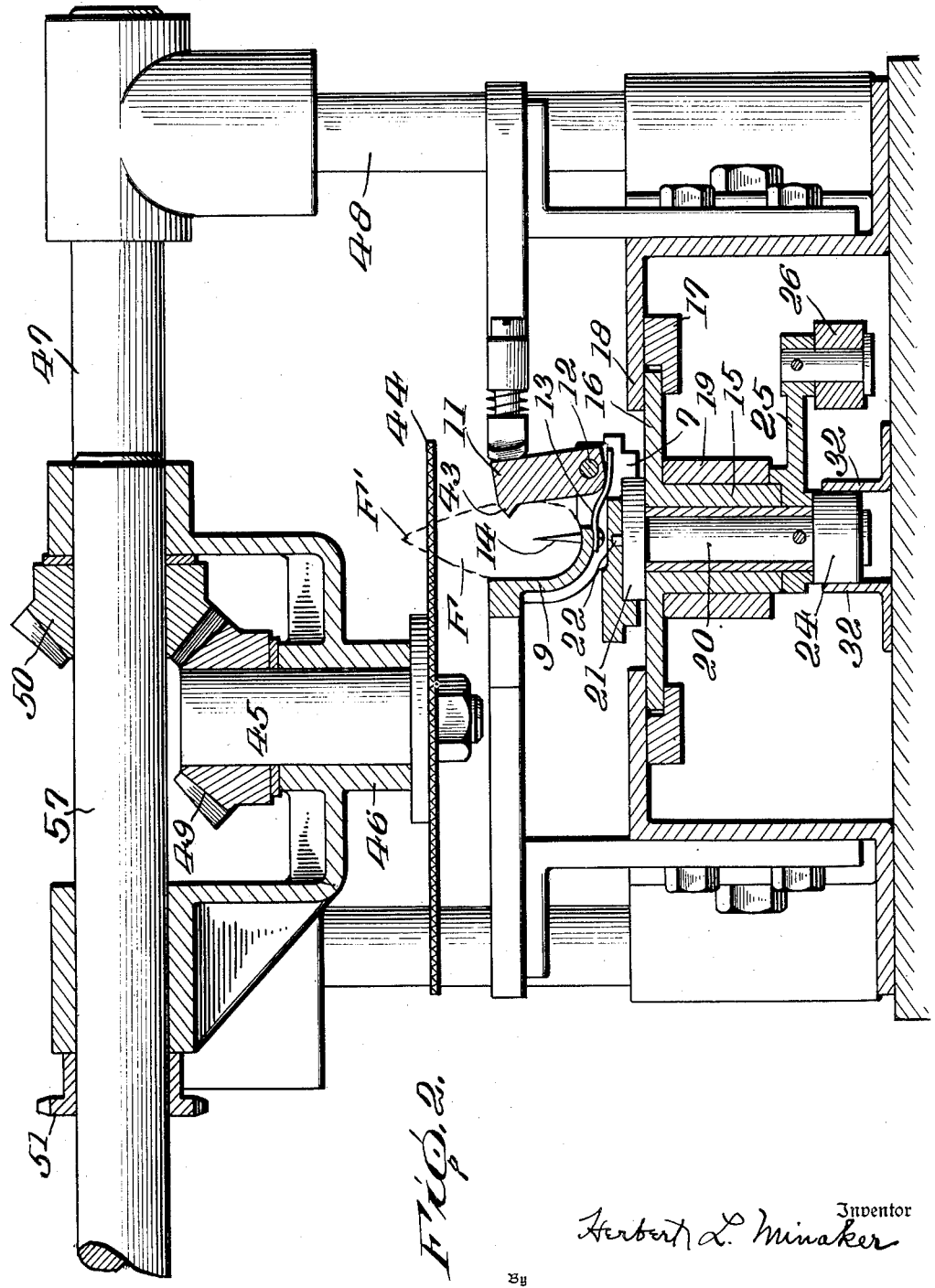

Sept. 5, 1950  H. L. MINAKER  2,521,241
FISH CUTTING AND CLEANING MACHINE
Filed July 29, 1944  3 Sheets-Sheet 3
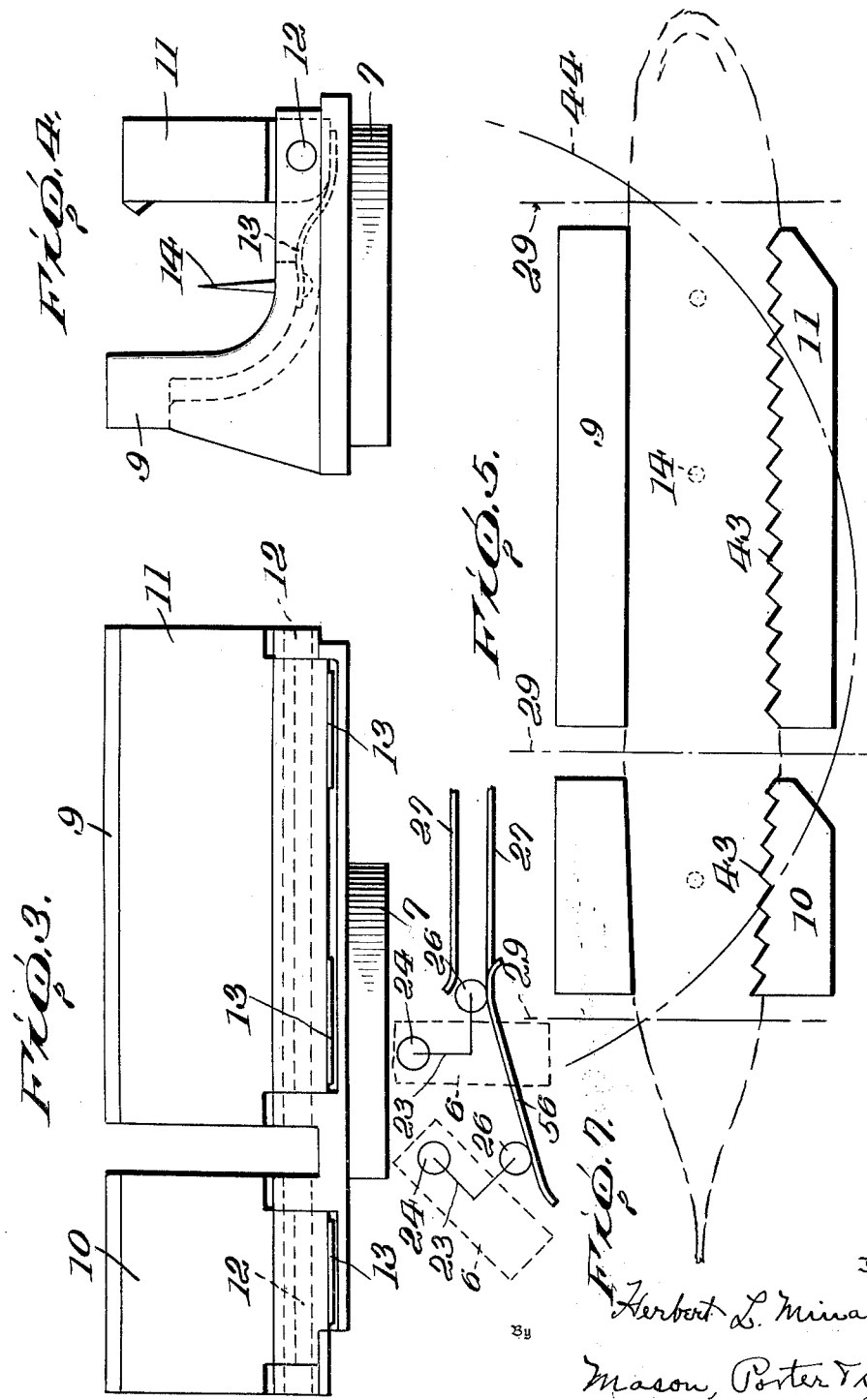
Inventor
Herbert L. Minaker
By Mason, Porter & Diller
Attorneys Patented Sept. 5, 1950

2,521,241

UNITED STATES PATENT OFFICE 2,521,241

FISH CUTTING AND CLEANING MACHINE

Herbert L. Minaker, Syracuse, N. Y., assignor to Continental Can Company, Inc., New York, N. Y., a corporation of New York Application July 29, 1944, Serial No. 547,188

5 Claims. (Cl. 17—3)

The invention relates to new and useful improvements in a fish cutting and cleaning machine of the type shown in the patent granted to Mervin O. Palmer on September 25, 1934, No. 1,975,018. In this machine the fish is placed in a series of impaling pins 14 mounted on the for removing the head and tail and for cutting the fish into two lengths. The carrier is then turned and presented to a cutting knife which slits the fish lengthwise, after which a spreader separates the sides and a cleaning brush removes the entrails.

An object of the present invention is to provide a machine of the above type with a rotating cutter for removing the belly portion of the fish.

A further object of the invention is to provide a carrier for the fish wherein the body portion and tail portion of the fish are individually clamped and firmly held in the carrier while the fish is being presented to the knife for removing the belly portion.

These and other objects will in part be obvious and will in part be hereinafter more fully disclosed.

In the drawings—

Figure 1 is a view showing more or less diagrammatically a side view of a machine embodying the improvements;

Figure 2 is a sectional view on the line 2—2 of Figure 1;

Figure 3 is a side view of one of the carriers removed from the machine;

Figure 4 is an end view of the carrier;

Figure 5 is a view showing more or less diagrammatically the clamping jaws in plan view;

Figure 6 is a view showing more or less diagrammatically the carrier, the guide rails for turning the carrier from a transverse to a longitudinal position and the presser bars operating upon the carrier for clamping the fish firmly to the carrier during the cutting of the belly portion therefrom; and Figure 7 is a diagrammatic view showing the guide rail which positively swings the carrier to its initial transverse position.

The machine includes a suitable supporting frame 1, on which is mounted an endless conveyor 2. The endless conveyor is made up of a series of links pivoted together, thus forming an endless conveyor of the chain type. The conveyor runs over a sprocket wheel 3 at the receiving end of the machine and a sprocket wheel 4 at the delivery end of the machine. A shoe 5 contacts with the lower run of the chain and takes up the slack in the chain. Mounted on selected links in the chain are carriers 6. These carriers are all of similar construction and the description of one will answer for the others.

The carrier consists of a base plate 7 having a fixed jaw 9 attached thereto. The inner face of this jaw is curved to conform generally to the curvature of a fish body in cross section. Also mounted on the base plate 7 are two pivoted jaws 10 and 11. The jaw 11 is pivoted at 12 and leaf springs 13, 13 fixed to the body portion of the carrier extend underneath the jaw, bearing against the bottom portion thereof. The bottom portion of the jaw has its inner edge rounded and when the jaw is moved inward, it will flex the springs so that the springs will normally tend to force the jaw outward for a limited distance. The carrier jaw 10 is of similar construction and is likewise provided with a leaf spring yieldingly holding the jaw in its outer position so that the carrier is opened preparatory to the receiving of the fish therein. There are a series of impaling pins 14 mounted on the fixed jaw which position the fish in the carrier.

The links of the conveyor on which the carriers are mounted include a hub 15 to which are attached guide plates 16 adapted to slide along tracks 17, 17 carried by the main frame. At certain sections of the machine are side frame members supported by the tracks and overhanging the guide plates, as indicated at 18. The hub 15 is mounted in a conveyor link indicated at 19. Journalled in the hub is a short shaft 20 carrying a disk 21 at its upper end which fits in a recess in the base plate 7 of the carrier. Pins 22, 22 mounted on the disk engage recesses in the base plate so that the base plate will turn with the disk when the shaft 20 is oscillated.

Attached to the lower end of the shaft is a bracket arm 23 carrying a roller 24. There is also a second bracket arm 25 attached to said shaft which carries a roller 26. These bracket arms are connected to the shaft at right angles to each other. When the carrier is in a position transverse of the conveyor the roller 26 is passing between two guide rails 27, 27 attached to the frame of the machine. This will hold the carrier firmly in its transverse position. While in this position the carrier presents the fish placed therein to cutting knives mounted on a shaft 28. There are three cutting knives, one of which is illustrated at 29. These cutting knives operate precisely as described in the Palmer patent, supra. One cuts off the head, another the tail, and the third which is intermediate the two first-named knives, cuts the body into two sections.

After passing these cutting knives the carrier is rotated through an arc of 90° so that the carrier extends lengthwise of the path of travel of the conveyor. This is accomplished by the shaping of the guide rails. The guide rail 27 at the left, as viewed in Figure 6, is curved to the right away from the path of travel of the conveyor and this will gradually force the roller 26 to the right, causing the shaft 20 to turn in a clockwise direction and thus the carrier is turned from the transverse position toward a longitudinal position as shown in this Figure 6. The roller 24 will be moved to a position so that it engages a cam rail 30 and will pass in between this cam rail 30 and a cam rail 31. These cam rails 30 and 31 lead to straight guiding sections 32, 32 so that the roller 24 will pass along between these guiding sections 32, 32 and hold the carrier in its longitudinal set position.

It will be understood that these guiding devices which position the carrier through operation upon the rollers 24 and 26 are all located beneath the path of travel of the conveyor. Mounted above the path of travel of the conveyor are guide bars which firmly hold the jaws of the carrier in clamping engagement with the fish while the belly portion of the fish is being removed. One of these guide bars has a stationary section indicated at 33. The receiving end of this guide bar is tapered as indicated at 34 so as to direct the fixed jaws of the carrier along the inner side of this guide rail 33. This makes a rigid fixed support which holds the carrier from lateral movement as it travels along the same. The guide rail 35 at the opposite side of the machine is carried by a supporting bracket 36. Said guide rail is supported by bolts slidable in the bracket and springs 37, 37 placed between the guide rail 35 and the bracket normally force the guide rail inward toward the center line of the machine and the heads of the bolts limit this inward movement. The receiving end of the guide rail 35 is tapered as indicated at 38. There is a second guide rail 39 carried by the bracket 36. This guide rail 39 is supported by bolts 40 and springs 41 serve to force the guide rail inwardly, the heads of the bolts limiting the inward movement of the guide rails.

As the carrier approaches these guide rails the movable jaw 11 will contact with the tapered portion 38 of the guide rail 35 and will be forced inward by said guide rail through the action of the springs 37 thereon. As this movable jaw 11 passes off from the guide rail 35 it will contact with the guide rail 39 which also has a tapered end 42 and this guide rail 39 will then yieldingly press this jaw 11 of the carrier against the fish, clamping the fish firmly against the fixed jaw 9 of the carrier which is backed up by the guide rail 33. The movable jaw 10 as it comes into contact with the guide rail 35 will be moved into clamping engagement with the tail end portion of the fish.

Each of the movable jaws has its inner face serrated as indicated at 43, which aids in the firm grip of the fish by the carrier. The carrier with its firm grip upon the fish presents the fish to a horizontally rotating cutting knife 44 which is preferably provided with a serrated edge and is therefore in the nature of a saw. This cutting saw is mounted on a shaft 45 mounted for rotation in a bracket 46 which in turn is carried by cross rods, one of which is indicated at 47 in Figure 2. These cross rods are mounted in posts 48. The shaft 45 carries a bevel gear 49 meshing with a bevel gear 50 and this bevel gear 50 is fixed on a shaft 57 which carries a sprocket wheel 51. A sprocket chain 52 runs over the sprocket wheel 51 and imparts rotation to the horizontally moving saw. This sprocket chain also operates the cutters on the shaft 28. In Figure 2 of the drawings the fish is indicated at F. It is firmly clamped between the jaws 9 and 11 and while clamped to the carrier, it is presented to the saw 44 and the belly portion F' is cut so that it is removed and discarded. The reason for providing the carrier with two clamping jaws is to ensure that the tail portion of the fish, which is of less thickness than the main body portion, will be firmly clamped to the carrier. The same reason applies for making the guide rails 35 and 39 separate. It is the guide rail 35 operating upon the jaw 10 that clamps the tail portion of the fish firmly while the belly portion is being cut from the fish and it is the guide rail 39 acting on the jaw 11 which clamps the body portion of the fish during this removal of the belly portion.

After leaving the horizontal saw for removing the belly portion, the carrier then presents the fish to a cutting knife 53 rotating about a horizontal axis. This cutting knife will split the fish lengthwise, cutting into the fleshy part of the fish adjacent the back bone but not cutting the fish in two. This is to facilitate the cleaning of the fish. The carrier next presents the fish so as to permit a brush 55 to enter and remove the entrails. This brush will effectively clean the entire visceral cavity.

After the carrier control rollers leave the guide rails and the carriers pass around the sprocket 4, the carrier will be free and because of its off center weight, it will shift to some extent toward a transverse position. Associated with the sprocket wheel 3 at the receiving end is a guide rail 56. This guide rail as shown in a diagrammatical view (Figure 7) is inclined and will engage the roller 26 and this will positively swing the carrier to a transverse position.

It is obvious that minor changes in the details of construction and arrangement of parts may be made without departing from the spirit of the invention as set forth in the appended claims.

I claim:

1. A fish dressing machine comprising an endless conveyor, a series of carriers mounted thereon, a horizontally rotating cutter having a cutting edge mounted above said carriers and operating upon fish placed bottom up in the carriers for removing the belly portion of the fish, each carrier including fixed jaws and a movable jaw associated with each fixed jaw, and guides mounted parallel to the conveyor for engaging said jaws for forcing the movable jaws into firm clamping contact with the fish during removal of the belly portion of the fish.

2. A fish dressing machine comprising an endless conveyor, a series of carriers mounted thereon, a horizontally rotating cutter having a cutting edge mounted above said carriers and operating upon fish placed bottom up in the carriers for removing the belly portion of the fish, each carrier including fixed jaws and a movable jaw associated with each fixed jaw, and guides mounted parallel to the conveyor for engaging said jaws for forcing the movable jaws into firm clamping contact with the fish during removal of the belly portion of the fish, each movable jaw having serrations on its inner face for firmly gripping the fish and holding it from endwise movement in the carrier.

3. In a machine of the class described, an endless conveyer, a series of carriers mounted on the conveyer, means for holding a fish bottom up in each carrier, a vertical shaft for mounting each carrier, a pair of right-angularly disposed bracket arms fixed to each shaft, one arm of each pair extending longitudinally beneath the carrier, and parallel guide rails fixedly mounted in the path of said arms for engaging the arms and positioning the carrier axis longitudinally with respect to the direction of travel of the conveyor.

4. A machine of the class described comprising a conveyer, a series of carriers pivotally mounted on the conveyer, each of said carriers having a hinged side jaw, spring means holding the jaw in open position, a trimming knife mounted in a horizontal plane parallel to and above the plane of the conveyer and a stationarily mounted guide rail for moving each hinged pair to closing position during the passage of the carrier past the knife.

5. A machine of the class described comprising a conveyer, a series of carriers pivotally mounted on the conveyer, each of said carriers having a hinged side jaw, spring means holding the jaw in open position, a vertical knife on each side of the conveyer, controlling means for holding the carriers with their major axes transverse to the line of travel of the conveyer as the carriers pass the said knives, a trimming knife mounted in a horizontal plane parallel to and above the plane of the conveyer beyond the vertical knives, a pair of stationary cam rails for giving the carriers a quarter-turn before reaching the trimming knife and a stationarily mounted guide rail for moving each hinged jaw to closing position during the passage of the carriers past the said trimming knife.

HERBERT L. MINAKER.

REFERENCES CITED

The following references are of record in the file of this patent:

UNITED STATES PATENTS

| Number | Name | Date |
| --- | --- | --- |
| 1,647,170 | Barry | Nov. 1, 1927 |
| 1,819,060 | Baader | Aug. 18, 1931 |
| 1,975,018 | Palmer | Sept. 25, 1934 |
| 2,092,262 | Rieske | Sept. 7, 1937 |
| 2,149,021 | Hunt | Feb. 28, 1939 |
| 2,344,476 | Turnbull | Mar. 14, 1944 |
| 2,353,654 | Danielsson | July 18, 1944 |

FOREIGN PATENTS

| Number | Country | Date |
| --- | --- | --- |
| 222,621 | Great Britain | Oct. 9, 1924 |